Patented Sept. 16, 1930

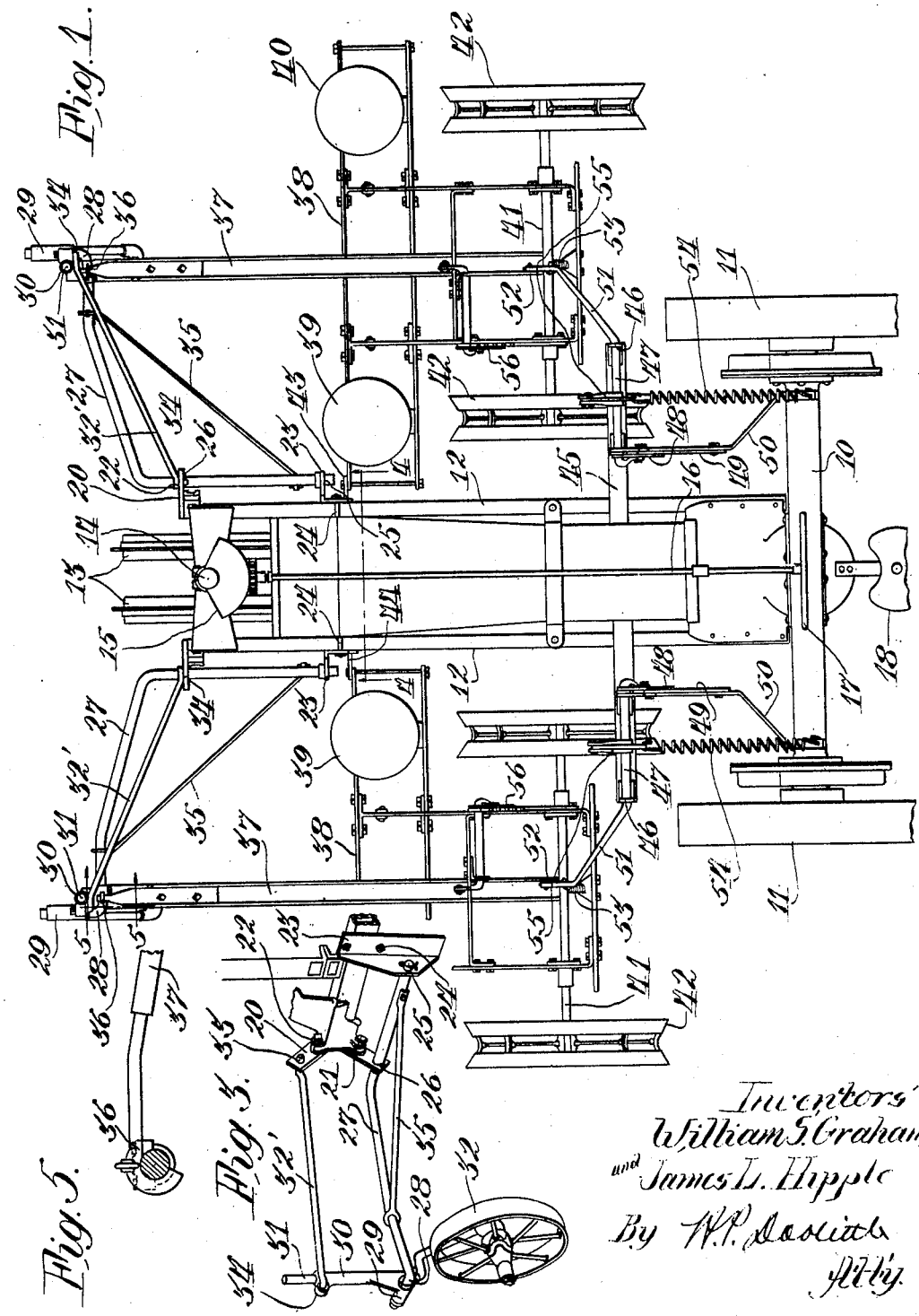

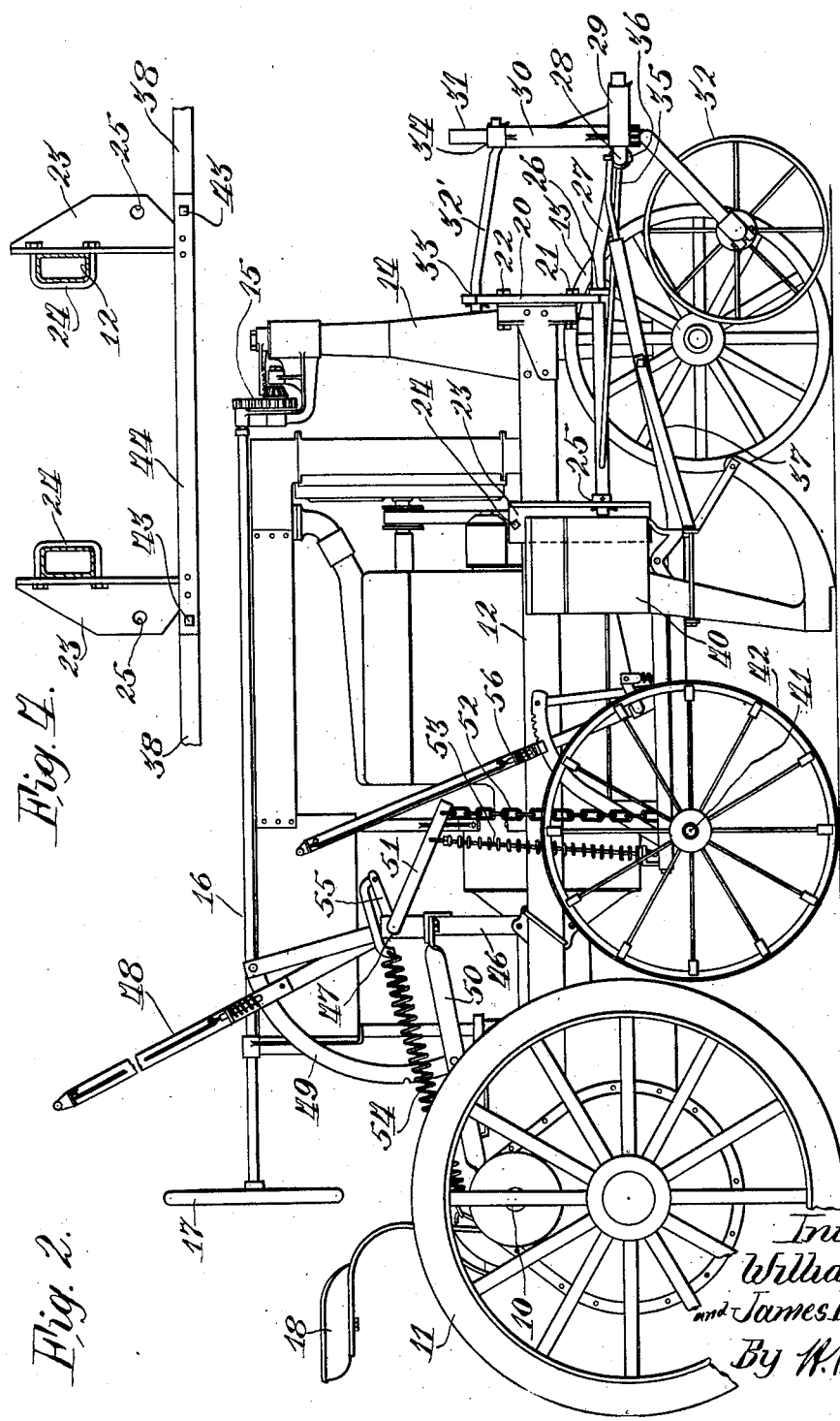

1,775,639

UNITED STATES PATENT OFFICE

WILLIAM S. GRAHAM AND JAMES L. HIPPLE, OF CANTON, ILLINOIS, ASSIGNORS TO INTERNATIONAL HARVESTER COMPANY, A CORPORATION OF NEW JERSEY

TRACTOR IMPLEMENT

Application filed June 24, 1929. Serial No. 373,269.

The present invention relates to self-propelled farm implements, and in particular to means for combining planters of conventional types with a row crop tractor in a manner to produce an efficient four-row planter of equivalent row crop implement.

The objects of the invention are to provide a simple and efficient floating draft frame for connection to each side of a tractor and to provide other parts co-operating with such draft frames and with standard two-row planters located forwardly at each side of the tractor in a manner to constitute an efficient and easily handled four-row self-propelled planter organization.

The invention accordingly resides in the organization and details of construction and equivalents thereof hereinafter more specifically described, and defined in the claims.

A preferred embodiment is illustrated in the accompanying drawings, where:

Figure 1 is a plan view of a tractor planter organization embodying the invention;

Figure 2 is a side elevation of the same;

Figure 3 is a detail perspective view of one of the draft frames;

Figure 4 is a transverse, sectional, detail view on the line 4—4 of Figure 1, with parts of the tractor body omitted; and, Figure 5 is a detail view on the line 5—5 of Figure 1.

In the present instance, the invention has been illustrated as embodied in an organization comprising a self-propelled vehicle or tractor having an arched rear axle structure 10 and traction wheels 11, which are laterally spaced in a manner to span the ground space ordinarily required for two plant rows of such crops as corn or cotton. The tractor has a narrow, central body comprising side members 12 secured at the rear to the axle structure 10 and supported at the front on a steering truck having suporting wheels 13 and a vertical spindle 14, which is swiveled in the forward end of the tractor body and is connected by suitable gearing at 15 to the steering rod 16 and wheel 17 extending to the operator's station or seat 18 at the rear of the tractor. The side members 12 support the power plant, transmission mechanism, etc., of the tractor in the usual manner and constitute the narrow body referred to.

At the forward end of the tractor body, each of the side members 12 has secured thereto a bearing bracket 20, which may consist of an angular member or bar bolted at 21 and 22 to attaching brackets on the tractor so that the arms of the bar diverge upwardly and downwardly, as best seen in Figure 3. At points spaced rearwardly from the bearing brackets 20, each side bar 12 has secured to it a depending upright bearing member or plate 23, which is preferably formed from angle iron, having one web secured to a side member 12, as by a U-bolt 24 (Figure 4). The other web of each member 23 extends outwardly and is provided with a bearing aperture 25, which is in longitudinal alignment with a similar bearing aperture 26 in the lower arm of the bearing bracket 20. The bearing openings 25 and 26 receive one branch of an angular member 27, which is preferably formed of a cylindrical rod bent to provide angularly related branches, as best seen in Figure 1. The other branch of member 27 extends outwardly and forwardly from the tractor in advance of the bearing bracket 20 and terminates in a forwardly bent end 28, which is journaled in a bearing 29 formed on the outer side of an upright sleeve 30. The sleeve 30 receives a vertical spindle or standard 31 of a caster wheel 32 which supports the free end of member 27. In order to maintain the sleeve 30 and its caster wheel in upright position, a link 32' is pivoted to the upper arm of bearing bracket 20 at 33 and to the upper end of the sleeve 30 at 34.

To provide additional rigidity to the member 27, there is preferably provided a diagonal brace member 35 connecting the two branches of that member. The foregoing construction, which is identical at each side of the tractor, provides laterally extending floating draft frames, which will accommodate themselves to variations in the surface over which the machine may travel. The outer end of each member 27 serves as a point of connection for a draft hook, or clevis 36 on the forward end of a draft tongue 37 forming part of the frame structure of a two-row planter of any standard type. Such a planter comprises a transversely extending frame 38, to which the draft tongue 37 is centrally secured, and on each end of which are mounted the planting units 39 and 40. The planter frame is supported on the usual axle 41 from wheels 42 from which the planting mechanisms are driven. The length of the outwardly extending parts of the floating draft frame is such as to locate the planting units on the planter at each side of the tread line of a tractor wheel ahead of which the planter travels, and the planters at each side of the tractor are so located that the spaces between the four planting units are equal. In order to maintain the two planters in properly spaced position, the inner ends of the transverse frames 38 are connected at 43 by a tiebar 44, which passes beneath the tractor body and below the lower edges of the upright members 23.

In order to provide mechanism for lifting and lowering the planters from and to operative position, the rearward portion of the tractor body has secured to it a transverse bar 45 having uprights 46, in the upper ends of which are journaled crank shafts 47, to which are secured adjusting levers 48 cooperating with locking racks 49 secured on one of the uprights 46 and also to a rearwardly extending brace 50, which has its rear end attached to the tractor axle. Each crank shaft 47 has a forwardly extending arm 51, which is connected by a lifting chain 52 and spring pressure rod 53 to the rear portion of a planter frame. It will be obvious that swinging of lever 48 will bodily raise or lower the planter to which it is connected, while the draft frame and caster wheel 32 remain in contact with the ground. To assist the lifting operation, each crank shaft 47 is preferably connected to a tension spring 54 extending from a point on the tractor axle to a fixed arm 55 on the shaft 47. The planting units may be adjusted for depth by the usual planter lever 56 on each planter.

The organization above described, therefore, provides an implement embodying a tractor, floating draft frames, and two two-row planters located at each side of the tractor, in a manner to plant four equally spaced rows, each planter being actuated from its own supporting wheels in the usual manner and individually following the variations in ground surface by reason of the flexible connections between the planters and to the floating draft frames and tractor. It will also be obvious that the operation of the planters may be readily interrupted by lifting them from the ground, after which the tractor may be turned on a short radius in the usual manner.

While the invention has been illustrated as embodying a planter organization, it will be evident that the floating draft frames are of a type permitting other implements to be connected thereto substantially in the manner above disclosed, without departure from the spirit of the invention as defined in the appended claims.

What is claimed is:

1. A four-row planter comprising the combination with a self-propelled vehicle having a rear axle and wheels adapted to span the space of two plant rows and a narrow central body supported at the front on a steering truck positioned on a line midway between the rear wheels, of vertically floating draft members hinged to the forward end of the vehicle body at each side thereof and extending outwardly therefrom, means for supporting the outer portions of the draft members, a two-row, wheel supported, planter located at each side of the central body having planting units positioned forwardly of the rear axle at each side of the tread line of the adjacent rear wheel of the vehicle, a draft connection between each planter and the outer portion of a draft member, and means on the vehicle for bodily lifting and lowering each planter.

2. A four-row planter comprising the combination with a self-propelled vehicle having a rear axle and wheels adapted to span the space of two plant rows and a narrow central body supported at the front on a steering truck positioned on a line midway between the rear wheels, of draft frames comprising a vertically spaced pair of laterally extending members hinged to the forward end of the vehicle body at each side thereof on longitudinal axes, upright tubular members to which the outer ends of said members are hinged on longitudinally extending axes, caster wheels having standards swiveled in the tubular members, means for restricting the movements of said frame members to vertical planes, a two-row wheel supported planter located at each side of the central body having planting units positioned forwardly of the rear axle at each side of the tread line of the adjacent rear wheel of the vehicle, and a draft connection between each planter and one laterally extending draft frame.

3. A four-row planter comprising the combination with a self-propelled vehicle having a rear axle and wheels adapted to span the space of two plant rows and a narrow central body supported at the front on a steering truck positioned on a line midway between the rear wheels, of vertically floating draft devices extending outwardly from the front of the vehicle body including bearing brackets secured to the front end of the body at each side, vertically extending bars secured to each side of the body rearwardly of the brackets with the brackets and bars formed with bearing openings aligned on a longitudinal axle, draft bars having cylindrical portions journaled in said openings and forward angularly extended portions projecting laterally from the vehicle body forwardly of the bearing brackets, a two-row wheel supported planter located at each side of the central body each comprising a transversely extended frame carrying planting elements located forwardly of the axle at each side of the adjacent rear wheel of the vehicle, a tiebar flexibly connecting the inner ends of the planter frames and passing under the vehicle body and engaging the lower edge of the vertical bars, and draft connections between each planter and the laterally extending portion of a draft bar.

4. A draft frame attachment for mounting on one side of a tractor body comprising a bar having angularly related branches with one branch journaled in spaced bearing members adapted for attachment to the side of a tractor with the other branch of said bar extending laterally away from the tractor, an upright bearing sleeve having a bearing at one end in which the end of the laterally extending branch of said bar is journaled, a link pivotally connected to one of said bearing members and to the other end of said sleeve, and a caster wheel having a standard journaled in said sleeve.

In testimony whereof we affix our signatures.

WILLIAM S. GRAHAM.
JAMES L. HIPPLE.